(12) United States Patent
Morimoto et al.

(10) Patent No.: US 6,593,713 B2
(45) Date of Patent: Jul. 15, 2003

(54) CONTROL APPARATUS FOR HYBRID VEHICLE

(75) Inventors: Kazuhiko Morimoto, Hamamatsu (JP); Yoshiaki Omata, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 8 days.

(21) Appl. No.: 09/921,485

(22) Filed: Aug. 3, 2001

(65) Prior Publication Data

US 2002/0014872 A1 Feb. 7, 2002

(30) Foreign Application Priority Data

Aug. 4, 2000 (JP) ......................................... 2000-236366

(51) Int. Cl.$^7$ ................................................. B60K 6/06
(52) U.S. Cl. ...................... 318/139; 318/476; 318/477; 290/38 R; 290/48; 180/65.2
(58) Field of Search ................................. 318/139, 140, 318/150, 430, 461, 465, 474, 476, 477; 290/30 R, 31, 36 R, 38 R, 38 B, 38 C, 46, 47, 48; 180/65.1, 65.2, 65.3, 65.4, 65.6; 477/99, 166, 167

(56) References Cited

U.S. PATENT DOCUMENTS

| | | | |
|---|---|---|---|
| 5,081,365 A | * | 1/1992 | Field et al. ................... 290/45 |
| 5,337,848 A | * | 8/1994 | Bader ......................... 180/65.2 |
| 5,568,023 A | * | 10/1996 | Grayer et al. ............... 318/139 |
| 5,839,533 A | | 11/1998 | Mikami et al. |
| 5,841,201 A | | 11/1998 | Tabata et al. |
| 5,895,333 A | | 4/1999 | Morisawa et al. |
| 5,935,040 A | | 8/1999 | Tabata et al. |
| 6,018,198 A | * | 1/2000 | Tsuzuki et al. ................ 290/17 |
| 6,018,199 A | | 1/2000 | Shiroyama et al. |
| 6,053,842 A | * | 4/2000 | Kitada et al. .................... 477/5 |
| 6,348,771 B1 | | 2/2002 | Morimoto et al. |
| 6,362,580 B1 | | 3/2002 | Omata et al. |
| 6,369,539 B1 | | 4/2002 | Morimoto et al. |
| 6,373,206 B1 | | 4/2002 | Morimoto et al. |
| 6,443,126 B1 | | 9/2002 | Morimoto et al. |

FOREIGN PATENT DOCUMENTS

| | | |
|---|---|---|
| JP | 9-72266 | 3/1997 |
| JP | 10-136508 | 5/1998 |
| JP | 11-187502 | 7/1999 |

* cited by examiner

*Primary Examiner*—Bentsu Ro
(74) *Attorney, Agent, or Firm*—Flynn, Thiel, Boutell & Tanis, P.C.

(57) ABSTRACT

A control apparatus utilizes an electric motor to initially start-up an engine. In an engine restart under certain conditions, the control apparatus sets a motor output value for the electric motor to a value exceeding the rated performance. Thus, when starting up the engine, the control apparatus makes up for a shortage of power by executing overload driving of the motor for a short time period. When certain conditions are not met, the control apparatus operates the electric motor in combination with a starter motor to restart the engine. The electric motor is located between the engine and a transmission.

12 Claims, 7 Drawing Sheets

ENGINE CONTROL MEANS
- EST : STARTER ON SIGNAL
- STR : STARTER DRIVING SIGNAL
- EIL : IDLE STOP EXECUTING SIGNAL

MOTOR CONTROL MEANS
- ST : STARTER SW "ON" INPUT
- IS : IDLE STOP EXECUTING SIGNAL (NEW)
- STD : STARTER DRIVING SIGNAL
  RELAY OUTPUT (NEW)

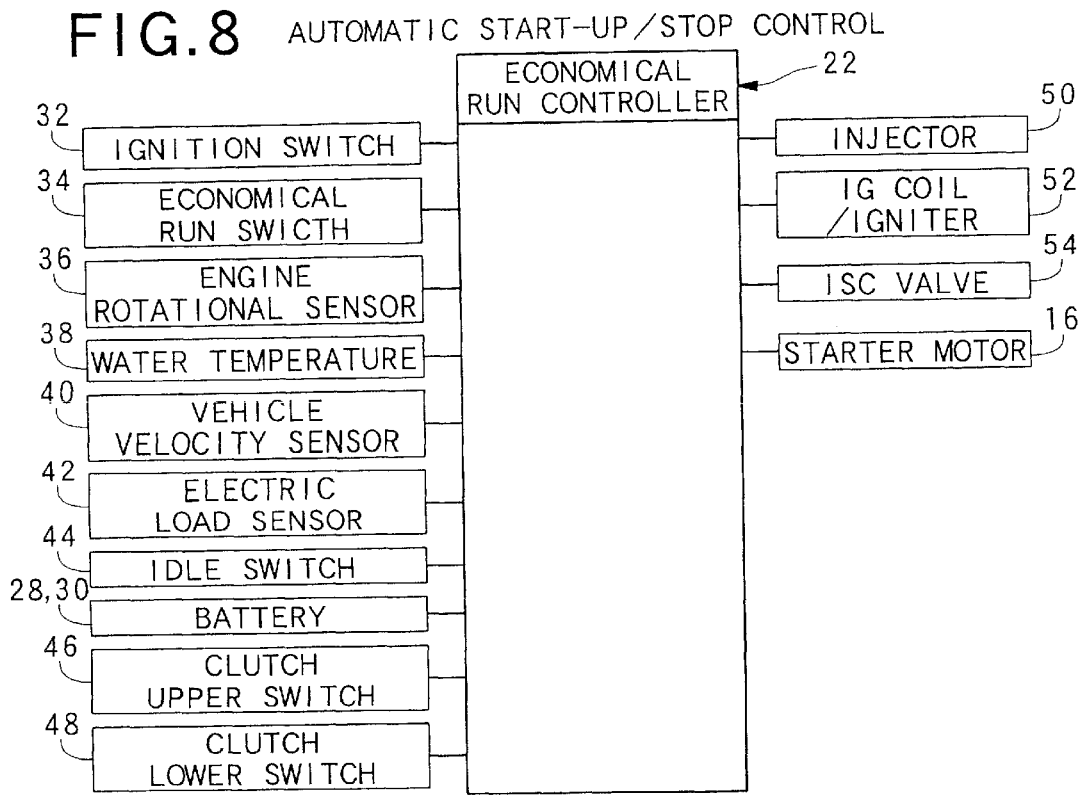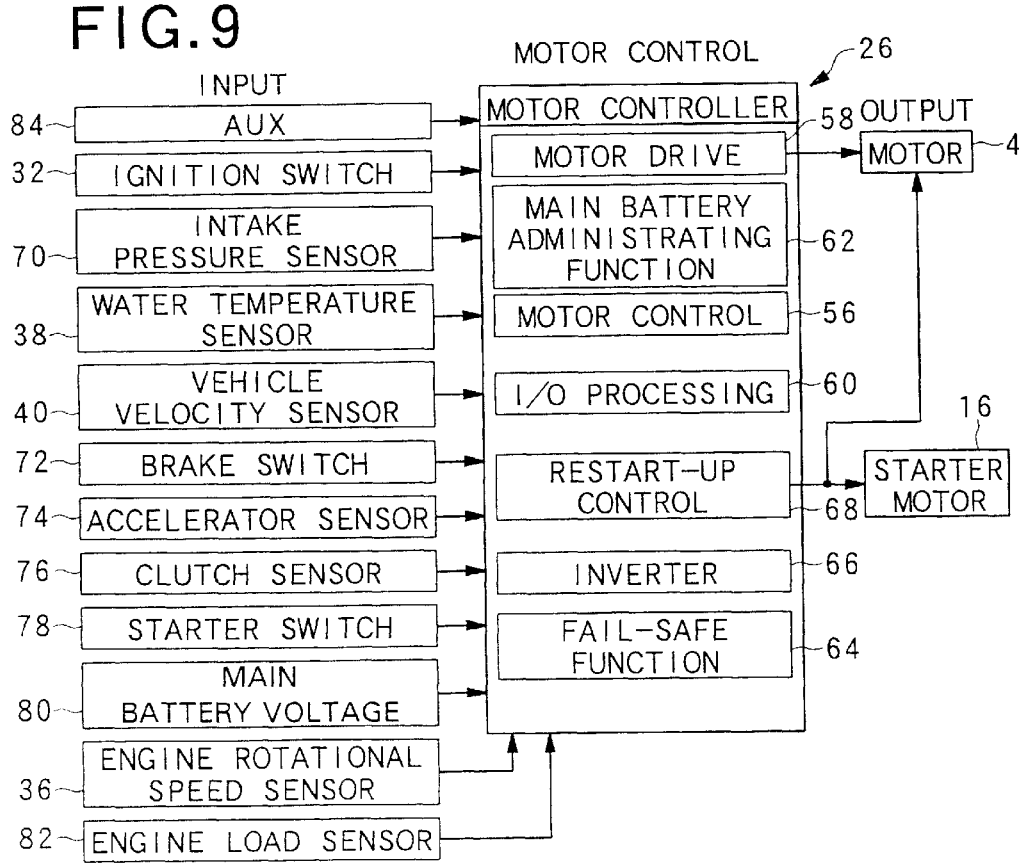

CONTROL APPARATUS FOR HYBRID VEHICLE

FIELD OF THE INVENTION

This invention relates to a control apparatus for a hybrid vehicle for setting a motor output value of an electric motor to a value that exceeds a rated performance when an engine is started up only by the electric motor. Miniaturization of the electric motor is also achieved.

BACKGROUND OF THE INVENTION

Some motor vehicles are of a type commonly called a hybrid vehicle having an internal combustion engine which is driven by combustion of fuel and an electric motor (described hereinafter as "motor") which is driven by electrical energy and has a power-generating function. The motor is provided to connect with an engine output axis of the engine. The hybrid vehicle further includes an engine control means for controlling a running state of the engine and motor control means for controlling an operating state of the motor. The engine control means and the motor control means detect respective operating states of the engine and the motor when the vehicle is traveling, and then exchange such detected data regarding the running states. As a result, the respective operating states of the engine and the motor are controlled in association with one another. Such a control system attains a high level of required performance (such as fuel efficiency, lower values of detrimental components in exhaust gases, and power performance). In this case, an apparatus includes a battery which supplies drive electricity to a motor and is charged by power-generation of the motor. A required volume of battery charge must be kept in order to perform suitable driving power-generation/driving prohibition for the motor. The apparatus administers the battery.

Moreover, there is a hybrid vehicle with an automatic start-up/stop control means to improve mileage or reduce effluent gas, by forcibly stopping an engine during stopping in an idling state.

One such example of a control apparatus of a hybrid vehicle is disclosed in published Laid-Open Japanese Application No. 9-72266. The vehicle start-up control apparatus of this disclosure possesses an internal combustion engine having a crank shaft, a fuel supply means to save and maintain fuel in a pressure state and to directly supply fuel of predetermined pressure force in a cylinder of the engine, an ignition means to ignite fuel supplied in a cylinder, a pressure force rising means to be driven with the crank shaft and to raise fuel pressure force to a predetermined pressure force. A fuel pressure force detecting means detects fuel pressure force in the fuel supply means. Further, the control apparatus includes a motor connected with the crank shaft for rotating the crank shaft. A rotational changing means raises rotational speed of the motor to increase a fuel pressure force in start-up, when the fuel pressure force detecting means senses decreased fuel pressure. Accordingly, in a vehicle having an internal combustion engine that is directly supplied fuel in a cylinder, a starting-up performance in the state that a fuel pressure force deteriorates is improved. Starting-up performance when an engine temperature of the internal combustion engine is low is also improved.

Another control apparatus is disclosed in published Laid-Open Japanese Application No. 11-187502. The control apparatus for a hybrid vehicle in this disclosure possesses a motor, a first transmitting means which transmits a torque of the motor to a supplementary apparatus and a second transmitting means which transmits a torque of the motor to an internal combustion engine, and controls to stop an internal combustion engine in a vehicle stop and to start up an internal combustion engine with the motor. Further, the control apparatus comprises a clutch means that is arranged in between the motor and the second transmitting means and that can freely change a transmitting torque transmitted by the second transmitting means so that the motor receives a torque. A control means controls the clutch means such that a transmitting torque becomes zero at stoppage of the internal combustion engine, and such that a transmitting torque becomes smaller than the torque that occurs in the motor during internal combustion engine start. Accordingly, in this control apparatus, a low cost is planned, and a supplementary apparatus fully functions.

Incidentally, in a control apparatus for a traditional hybrid vehicle, an electric motor has a performance such that an output is provided at more than a predetermined value, so as to start up an engine by the motor only even at low temperatures.

However, performance to satisfy the engine start-up ability of a motor may not be necessary in other driving states.

If a system not needed for start-up of an engine is considered, there are many good opportunities to miniaturize a motor further.

In order to get adequate starting-up performance, motor size becomes large. Accordingly, the system leads to increased cost and is economically disadvantageous. In addition, as the weight increases, the space efficiency deteriorates. Therefore, as for these negative factors, the motor is disadvantageous in practical use.

Accordingly, an object of this invention is to secure sufficient performance in a driving state, except for start-up, and in a restart-up, to control so as to set a motor output value of an electric motor to a value exceeding the rated performance. Thus a shortage of power is overcome by executing overload driving for a short time.

As amplified later in the detailed description, the present invention provides a control apparatus for a hybrid vehicle having an engine and an electric motor connected to an engine output shaft of the engine mounted on the vehicle. The control apparatus performs an automatic start-up/stop control of the engine. The control apparatus starts the engine using a starter motor in a start-up by operation of a key, and always assists the electric motor. The control apparatus has a control means that controls to drive the electric motor by an engine activation signal so as to start up the engine using only the electric motor, at restarting-up of the engine when a start-up condition is satisfied during operation of an automatic start-up/stop control of the engine. The control means controls to drive the starter motor and the electric motor outputs an engine activation signal so as to always assist by using the electric motor when starting up with the starter motor, at restarting-up of the engine when a start-up condition is not satisfied during operation of an automatic start-up/stop control of the engine. The control means sets a motor output value of the electric motor to a value exceeding a rated performance when the engine restarts up by using only the electric motor. Accordingly, using the control means, the total time necessary to decide performance of the electric motor is short, but performance of the electric motor can be decided without adapting to a needed performance at start-up when high performance is necessary. Accordingly, miniaturization of the electric motor (because the performance necessary for the assist control that is a main purpose is not higher than a requirement at start-up) can be achieved. Space efficiency for carrying and mounting the motor in limited spaced in engine rooms and the like can be improved. The space efficiency that is a ratio to mount in limited space of engine rooms and the like can be improved. The whole system is capable of having a lighter weight. As a result, this system can contribute to improvement of exhaust gas purification performance and fuel efficiency performance.

In addition, the present invention provides a control apparatus for a hybrid vehicle having an engine and a electric motor connected to an engine output shaft. The control apparatus performs an automatic start-up/stop control of the engine, and suitably assists the electric motor. The control apparatus has a control means that controls the electric motor, which is arranged in between the engine and a transmission. The control apparatus executes overload driving of the electric motor when starting up the engine. Accordingly, in this system, as both vehicle types mounted with an engine only or a hybrid engine can be set to execute overload driving at a start-up of the engine. If size of the motor (depth and diameter direction) gives great influence to size of an engine room, the size of the motor can be suited to reasonable size and have enough performance to assist driving, and overload driving at start-up when enabled. As a result, this system can utilize a motor compact in size, and is advantageous in practical use.

Moreover, the control means controls the electric motor, which is arranged between the engine and transmission, so as to, when starting up the engine, execute overload driving. Thus the size of the motor can be a reasonable size to assist driving and so that overload driving at start-up is enabled. As a result, this system provide a small compact size for the motor

BRIEF DESCRIPTION OF THE DRAWINGS

FIG. 8 is a block diagram showing each sensor linked with a control means; and

FIG. 9 is a block diagram showing each sensor linking with a motor control means.

DETAILED DESCRIPTION OF THE INVENTION

A detailed explanation is given of embodiments according to the invention in reference to the drawings as follows.

Figure 5:
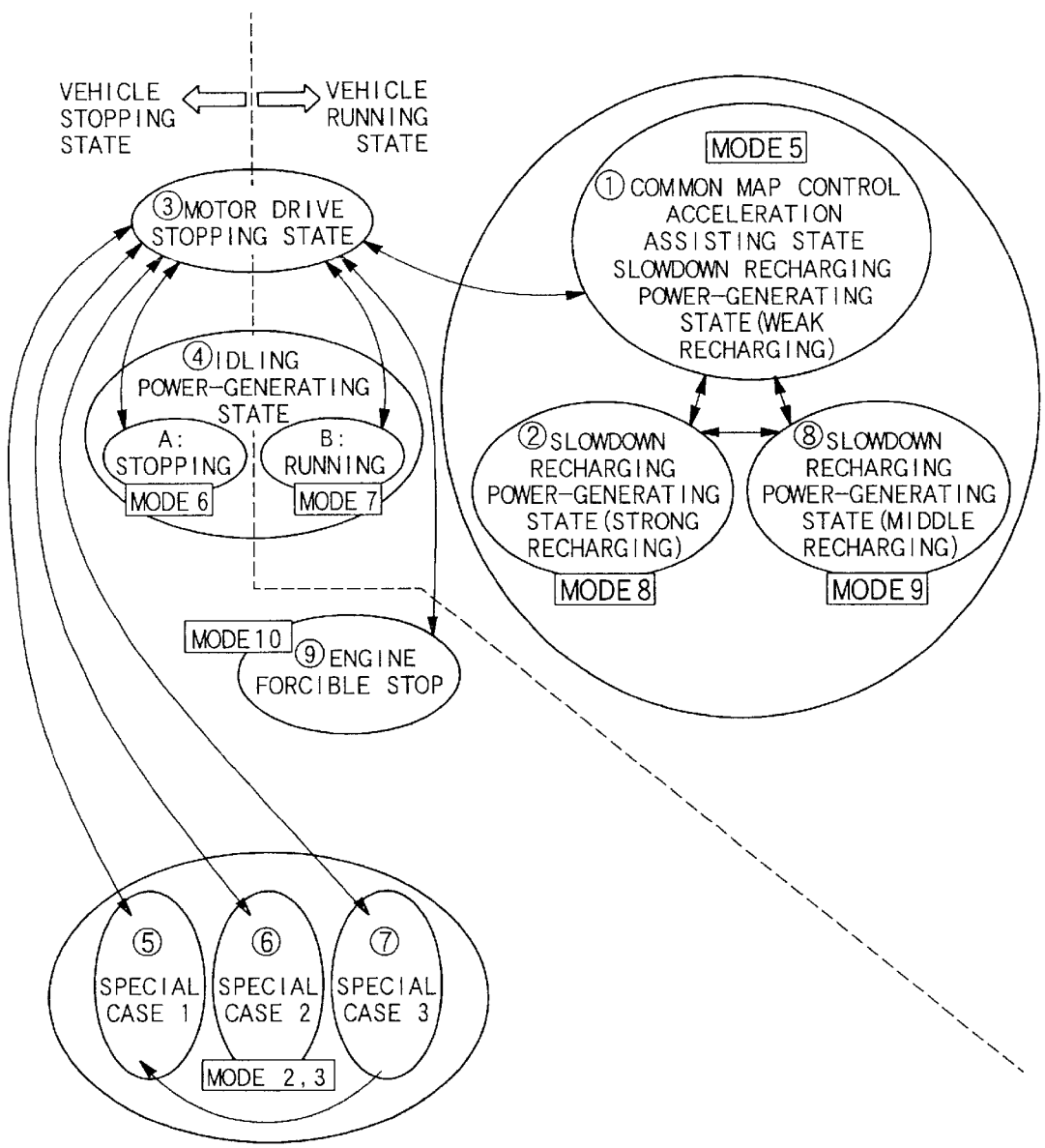
FIG. 5 is a schematic diagram showing a switchover of a motor assisting control state.
Figure 6:
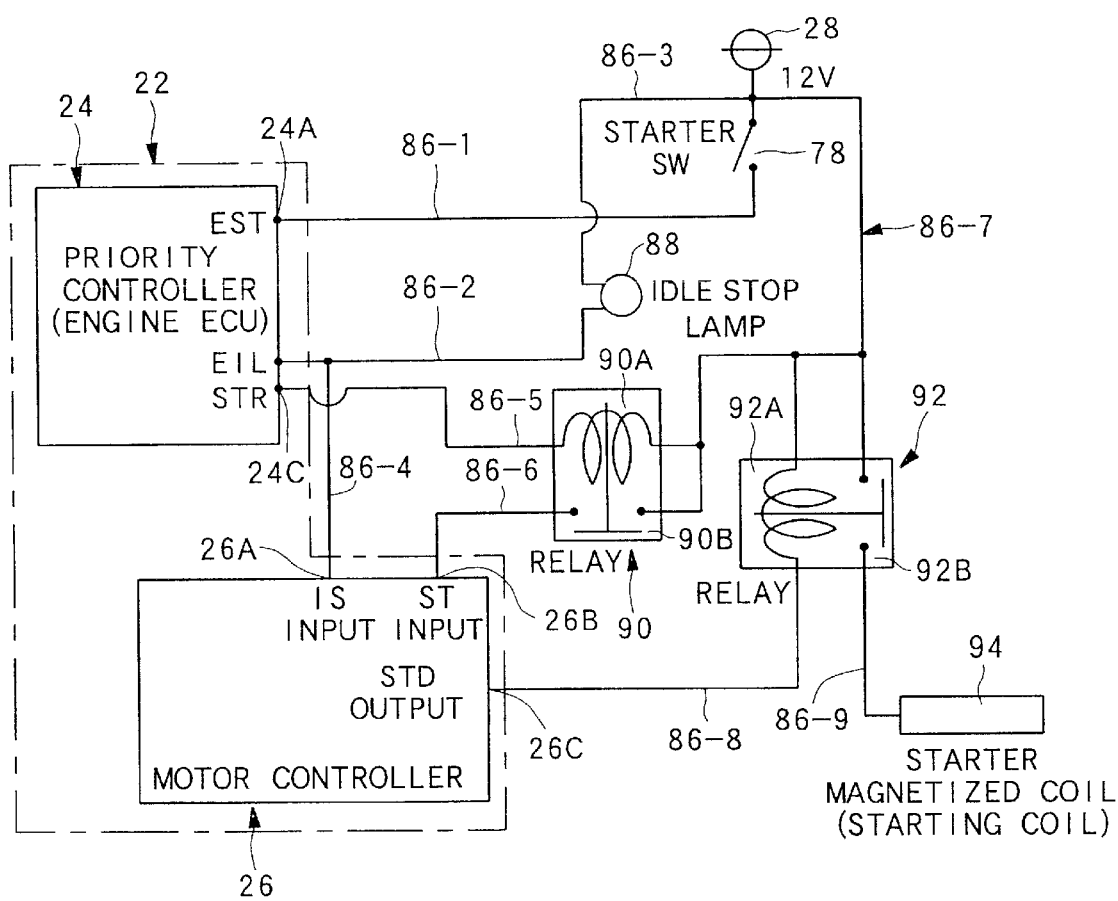
FIG. 6 is a diagram showing a signal line arrangement for hardware in a control means.
Figure 7:
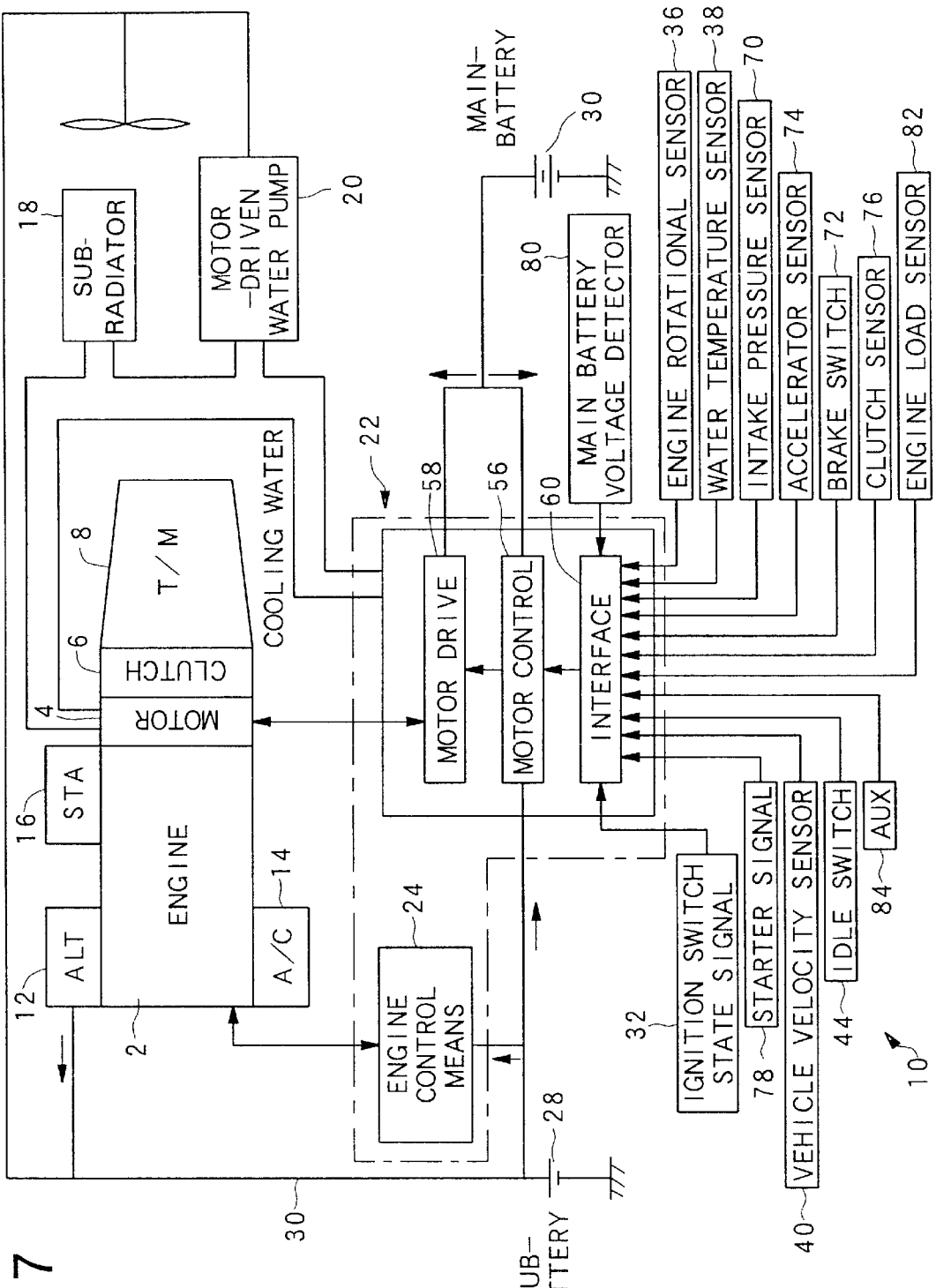
FIG. 7 is a diagram showing a vehicle system including a control apparatus.

FIGS. 1–9 show embodiments according to the invention. FIG. 7 shows an engine 2 mounted on a hybrid vehicle (hereafter described as "vehicle") (not shown); an electric motor 4 (hereafter described as "motor"); a clutch 6; a transmission 8; and control apparatus 10. The engine 2 drives by combustion of fuel. The motor 4 drives by electric energy and has a power-generating ability. The motor 4 is directly connected with a crank axis (not shown) of the engine 2. The clutch 6 transmits and cuts off an engine output to the transmission 8 side.

The engine 2 includes an alternator 12 for power-generation, an air-compressor 14 for an air-conditioner, a starter motor 16 for starting up the vehicle, a sub-radiator 18, and an electrically-driven water pump 20. The alternator 12 and the air compressor 14 are driven by a belt (not shown) fitted to a crank pulley. The starter motor 16 has a pinion gear engaging with a ring gear (not shown) and is connected to the flywheel (not shown) through a gear mechanism.

The engine 2 and the motor 4 are connected to a control means 22. The control means 22 constitutes an economical run control means, and executes an automatic start-up/stop control (economical run control) of the engine 2. In addition, the control means 22 has an engine control means (priority controller) 24 executing as a master at start-up and a motor control means 26 executing as a slave at start-up. The engine control means 24 is linked to a sub-battery 28 (12V). The sub-battery 28 is linked to the alternator 12, the starter motor 16, the sub-radiator 18, and the electric water pump 20.

The motor 4 is connected to a motor control means 26, which is linked to a main battery 30 (200V). The main battery 30 supplies driving electric power to the motor 4, and is charged by generated electric power from the motor 4, connecting with the motor control means 26.

Further, the control means 22, as shown in FIG. 8, is connected at the input side to: an ignition switch 32; an economical run switch 34; an engine rotational speed sensor 36; a water temperature sensor 38; a vehicle speed sensor 40; an electric load sensor 42; an idle switch 44 which becomes on when the engine 2 is in an idle driving state; a sub-battery 28/main battery 30 as battery; a clutch upper switch 46; and a clutch lower switch 48. The control means 22 is connected at the output side to: an injector 50; IG coil/igniter 52; and an ISC (idle speed control) valve 16.

The motor control means 26, as shown in FIG. 9, includes a motor control section 56, a motor drive section 58, an input/output processing section (interface) 60, a main battery administrating section 62, a fail-safe section 64, an inverter 66 and a restart-up control section 68.

The motor control means 26, as shown in FIG. 9, is connected at the input side to: ignition switch 32; intake pressure sensor 70; water temperature sensor 38; vehicle velocity sensor 40; brake switch 72; accelerator sensor 74; clutch sensor 76; starter switch 78; main battery voltage detector 80; engine rotational speed sensor 36; engine load sensor 82; and auxiliary input (AUX) 96. The motor control means 26 is connected at the output side to: motor 4 linking with a motor drive section 58 and a restart-up control section 68; and starter motor 16 linking with restart-up control section 68.

In the control means 22, a signal connecting state of the engine control means 24 and the motor control means 26 is as shown in FIG. 6. The engine control means 24 is connected at starter "ON" signal (EST) part 24A to starter switch 78 linking with sub-battery 28 by a first signal line 86-1. The engine control means 24 is connected at idle stop execution signal (EIL) part 24B to idle stop lamp 88 by a second signal line 86-2. The idle stop lamp 88 is linked to the sub-battery 28 by a third signal line 86-3. The second signal line 86-2 is connected to the fourth signal line 86-4 linking to an idle stop execution signal (IS) input part 26A of the motor control means 26.

Further, the engine control means 24 is connected at starter drive signal (STR) part 24C to a first coil part 90A of a first starter drive relay 90 through a fifth signal line 86-5. The first contact member 90B of the first starter drive relay 90 is connected to a starter switch-on signal (ST) input part 26B of the motor control means 26 through a sixth signal line 86-6.

The first starter drive relay 90 is connected to sub-battery 28 through a seventh signal line 86-7. The seventh signal line 86-7 is connected to a second starter drive relay 92. The second coil part 92A of the second starter drive relay 92 is linked to a starter drive relay signal (STD) output part 26C of the motor control means 26 through an eight signal line 86-8. In addition, the second contact member 92B of the second starter drive relay 92 is linked to a starter magnetized coil 94 through a ninth signal line 86-9.

The motor control means 26 supplies driving electric power to the motor 4, and inputs a main battery voltage signal from the main battery voltage detector 80 detecting a main battery voltage of a main battery 30 charged by generated electric power from the motor 4. Further, the motor control means 26 has control so as to govern the main battery mode by the main battery state administrating section 62.

The control states of motor 4, as shown in FIG. 5, for example, are the following seven kinds: first control state (1): a common map control: an acceleration assist and a slowdown recharging power-generation (weak charging), mode 5; second control state (2): a slowdown recharging power generation (recharging in large quantities), mode 8; third control state (3): motor drive stop (state waiting to sense whether each switchover condition is satisfied); fourth control state (4): idling power-generation, mode 6 (A: stopping) and mode 7 (B: running); fifth control state (5): special case 3 in special case control (start assist), mode 1; sixth control state (6): special case 2 in special case control (start-up assist), mode 2 (waiting) and mode 3 (executing); seventh control state (7): special case 3 in special case control (idle rotational speed stabilization assist), mode 4; eighth control state (8): a middle recharging power generation control, mode 9; and ninth control state (9): an engine forcible stop control, mode 10.

A control state of this motor 4, as shown in FIG. 5, switches over by a driving state of a vehicle. In other words, during each execution of first (1), second (2), fourth (4) and eighth (8) control states, when a switchover condition of control states (5), (6) and (7) for special case control (special cases 1 to 3) or control state (9) for engine forcible stop control is satisfied, then the first (1), the second (2), fourth (4) and eighth (8) control states are forcibly cancelled. Then the control state switches over to control states (5), (6) and (7) for special case control (special cases 1 to 3) or control state (9) for engine forcible stop control through motor driving stop in the third control state (3). In addition, the special case control (special cases 1 and 2) does not switch over to the other special case control directly. Control states (5), (6) and (7) for each special case control (special cases 1 to 3) or control state (9) for engine forcible stop control after a switchover do not switch over to other control states until decontrol condition is satisfied. However, control state (7) only for special case control (special case 3) switches over to control of special case 1, when the switchover condition of the first control state (1) is satisfied, before a decontrol condition is satisfied.

The control means 22 has a MAP-ST (a start assist map) as usual. The control means 22 executes an automatic start-up/stop control of engine 2 when the engine is in an idling state and when the vehicle is in a stop state. The control means 22 controls to start with starter motor 16, and to always assist motor 4 at starting-up of engine 2 by ignition key (not shown) linked to ignition switch 32. In addition, during operations of automatic start-up/stop control of engine 2, at restarting-up of engine 2 when a start-up condition is satisfied, the control means 22 controls to drive motor 4 by an engine activation signal so as to start up the engine 2 only with the motor 4. During operations of automatic start-up/stop control of engine 2, at restarting-up of engine 2 when a start-up condition is not satisfied, the control means controls to drive starter motor 16 and motor 4 outputting an engine activation signal so as to always assist with the motor 4 when starting up using the starter motor 16. The above-mentioned start-up condition is satisfied when the following conditions are satisfied: DC voltage is $\geq DCV1$ (V) ("voltage of main battery 30"$\geq DCV1$); engine water temperature is $\geq THW1$ (° C.); and torque is not in a torque limit (when a torque limit to protect motor 4 is not needed and control state is normal).

Further, when engine 2 restarts only by the motor 4 after a start-up condition has been satisfied during automatic start-up/stop control operations, control means 22 is composed so as to set the motor output value of motor 4 to a value that exceeds rated performance.

Specifically, control means 22 restarts engine 2 with a motor output value of motor 4, for example, that is set in an overload driving state of 120%. 120% being the value that exceeds a rated performance of 100%, and after a restart-up by the motor output value has been continued a set time, control means 22 controls to gradually decrease the motor output value of motor 4 that is set to the value that exceeds the rated performance.

Figure 3:
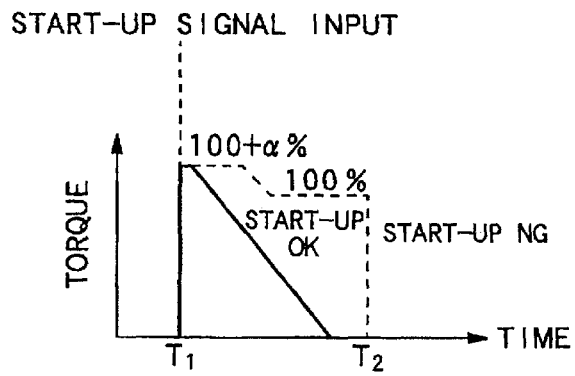
FIG. 3 is a schematic diagram showing a relation between torque and time.

In other words, a determination is made as to whether the following starting conditions are satisfied when the motor 4 is controlled in an overload driving state in order to overcome a stationary starting torque of the engine 2: (1) motor rotational speed: no more than Ne1 (rpm) (for example, Ne1 can be set at 50 rpm); and (2) continuing time: no more than T1 (msec) and a torque output is from 120% of a rated performance (the continuing time is selected to consider a capacity) (for example, T1 can be set at 300 msec). When these conditions are satisfied, then an overload torque over value is $100+\alpha$ (%) as shown in FIG. 3. Incidentally, this overload torque order value of $100+\alpha$ (%) can be set for example, at 120%.

In addition, a restart-up of the engine 2 is executed by the motor output value of motor 4 set by an overload driving state. An example shown by a solid line in FIG. 3 is of start up utilizing overload driving. An example shown by a dashed line in FIG. 3 represents a limit of overload driving control. A predetermined continuing time of overload driving is "T1" (msec) and the later continuing time of driving by a rated performance is "T2" (msec).

Furthermore, when a restart-up of the engine 2 by the motor 4 has not been successful, and when a restart-up of an engine by operation of an ignition key is executed additionally, then the control means 22 controls to immediately stop drive of the motor 4.

In addition, the control means 22 controls the motor 4, which is arranged in between engine 2 and a transmission 8, for use when starting up engine 2 and to execute overload driving at a start-up of the engine.

Motor 4 alone has an ability to start-up the vehicle under certain circumstances. Even if the start-up has failed, starter motor 16 recovers the start-up. Accordingly, this system satisfies the conduct of start-up.

Figure 4:
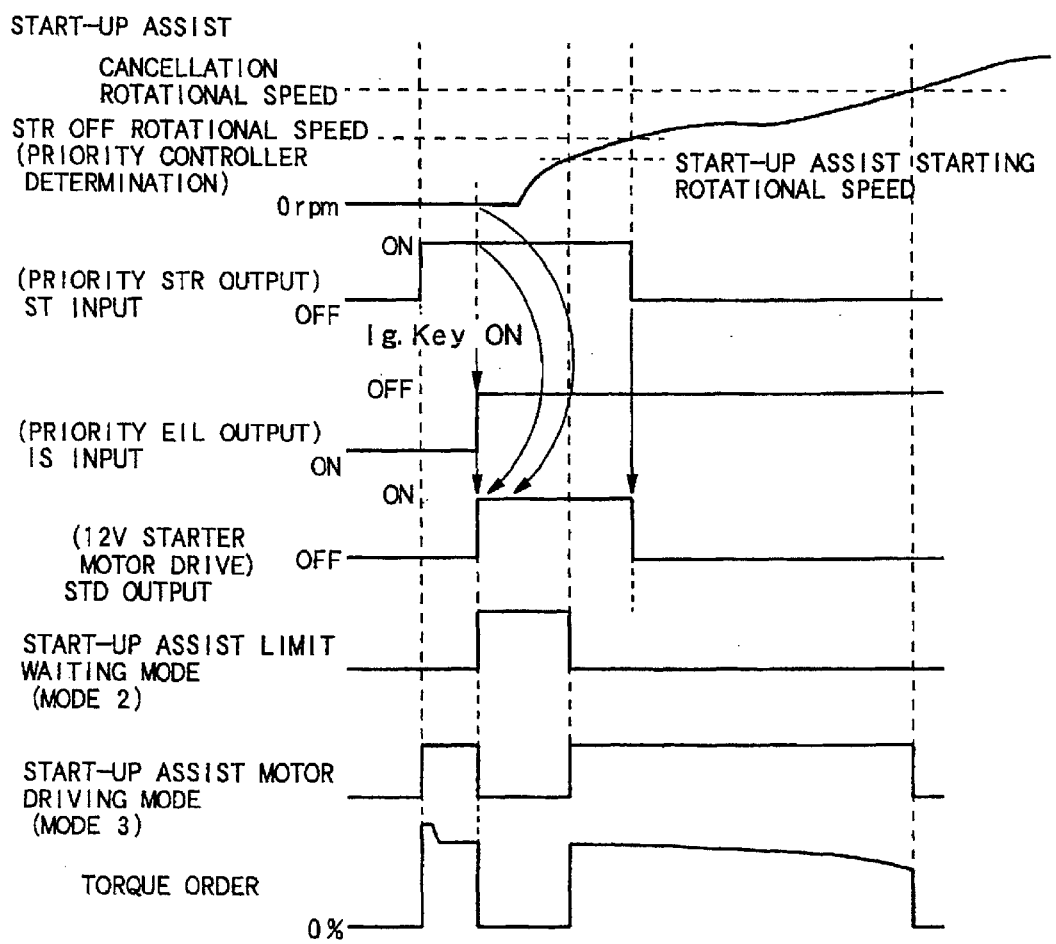
FIG. 4 is a time-chart showing a control in an idle stop restart-up.

Operation of the embodiment will now be described with reference to flowcharts in FIGS. 1 and 2 and a time chart in FIG. 4.

Figure 2:
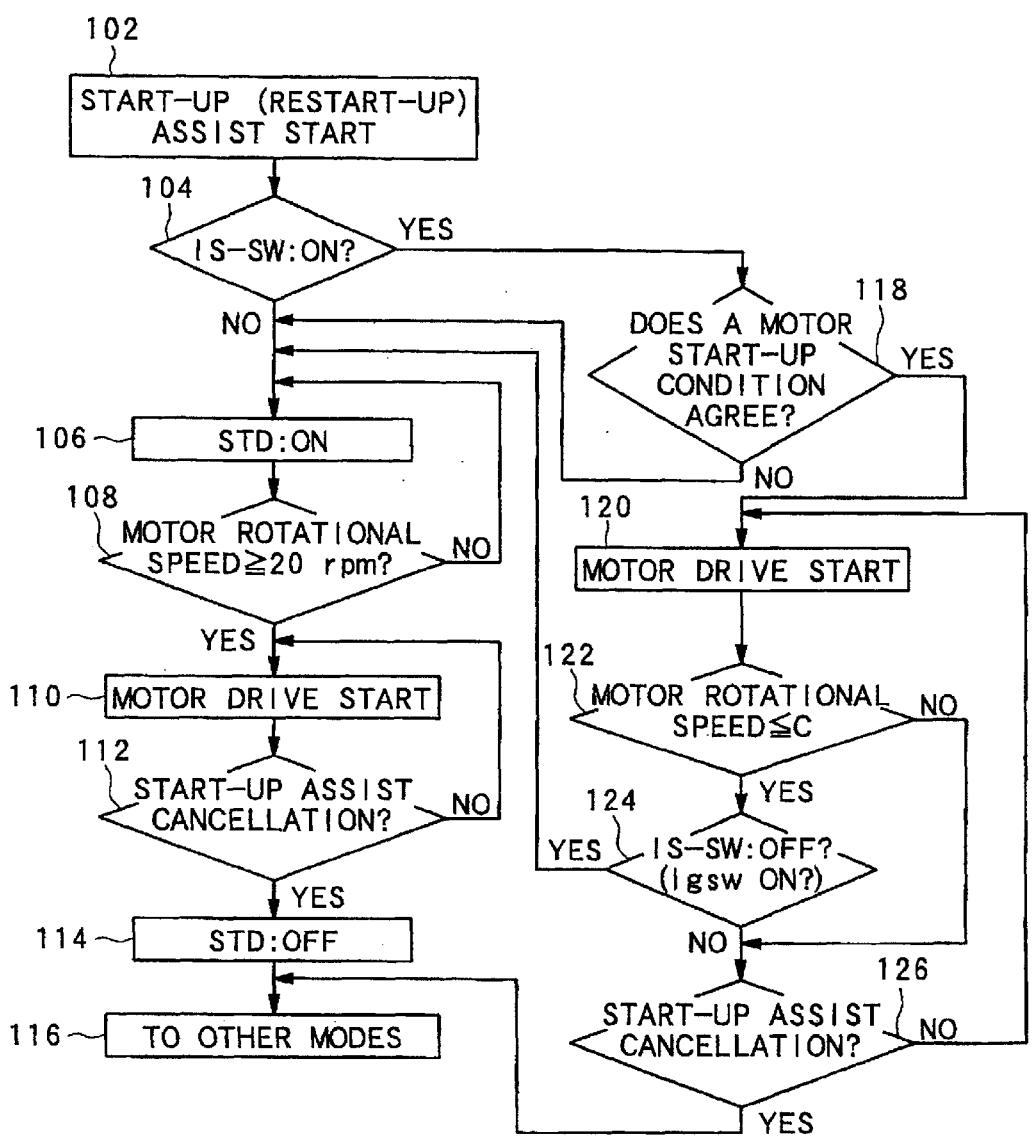
FIG. 2 is a control flowchart in a start-up (restart-up) control mode of an engine.

A controlling program to start assist for restart-up of engine 2 starts control at step 102, as shown in FIG. 2. Then a determination is made at step 104 as to whether an idle stop execution signal (IS-SW) is input. "IS-SW: ON?" is determined at step 104. When the determination in step 104 results in "NO" when an input signal of an idle stop (IS) is "H", idle stop is not executed (when automatic start-up/stop control is not executed). Then the 12V starter relay drive signal (STD) is output (STD: "ON") at step 106. Both first and second starter drive relays 90, 92 are switched to "ON" and starter motor 16 is driven by sub-battery 28. Then whether rotational speed of motor 4 is greater than or equal to setting rotational speed (20 rpm), "engine rotational speed≧20 rpm" is determined at step 108. When the determination in step 108 is "NO", then the routine is returned to step 106.

When the determination in step 108 is "YES", then driving of the motor 4 is executed by searching values of MAP-ST (start-up assist map) at step 110. Driving of the motor 4 works by a start assist torque order.

Therefore, when an input signal of idle stop (IS) is "H", and when idle stop is not executed, the engine starts up by using both motor 4 and starter motor 16.

A determination is made at step 112 as to whether a start-up assist is removed. When the determination in step 112 is "NO", then the routine is returned to step 110.

When the determination in step 112 is "YES", then an output of 12V starter relay drive signal (STD) is stopped at step 114 (STD: "OFF"), and both first and second starter drive relays 90 and 92 are switched to off. The routine is switched over to other modes at step 116.

When the determination in previous step 104 is "YES", when an input signal of idle stop (IS) is "L", and when idle stop is executed (when automatic start-up/stop control is executed), then a determination is made at step 118 as to whether a start-up condition of motor 4 is satisfied. This start condition agrees when all of the following conditions are satisfied: (DC voltage of main battery 30≧DCV1); engine water temperature≧THW1 (° C.); and torque is not within a torque limit to protect motor 4 and the control state is normal.

When the determination in previous step 118 is "NO" so that the start-up condition is not satisfied, the routine is returned to step 106. Therewith, the control means controls to output 12V starter relay drive signal (STD) (STD: "ON") and to switch both first and second starter drive relays 90 and 92 to on so as to start-up engine 2 by using both the motor 4 and starter motor 16. Thus, the starter motor 16 is driven by sub-battery 28, and when engine rotational speed of motor 4 is more than setting rotational speed (20 rpm), driving of motor 4 is started by searching for a value from MAP-ST (start-up assist map) at step 110.

When the determination in step 118 is "YES", meaning the above-mentioned start-up condition is satisfied, then driving of the motor 4 is started by a search value from MAP-ST (start-up assist map) at step 120 so as to start up engine 2 using only the motor 4. Thus, voltage supply from main battery 30, which is a larger voltage than sub-battery 28, drives the motor 4 to start as needed Then a determination is made at step 122 as to whether motor rotational speed of motor 4 is less than or equal to a predetermined value C (a fixed value). When the determination in step 122 is "YES", a determination is made at step 124 as to whether idle stop switch executing signal (IS-SW) is not input, is "IS-SW: OFF?". When the determination in step 122 is "NO", a determination is made at step 126 as to whether start-up assist is removed.

Incidentally, in step 124, the determination is made as to whether "IS-SW" is "OFF". However, the system can be changed to determine whether an ignition key switch is "ON".

In addition, if the determination in step 124 is "YES", the routine is returned to step 106. If the determination in step 124 is "NO", a determination is made at step 126 as to whether start-up assist is removed If the determination in step 126 is "NO", the routine is returned to previous step 120. If the determination in step 126 is "YES", the routine is returned to previous step 116.

The drive start of motor 4 in step 120 is now explained in detail.

Figure 1:
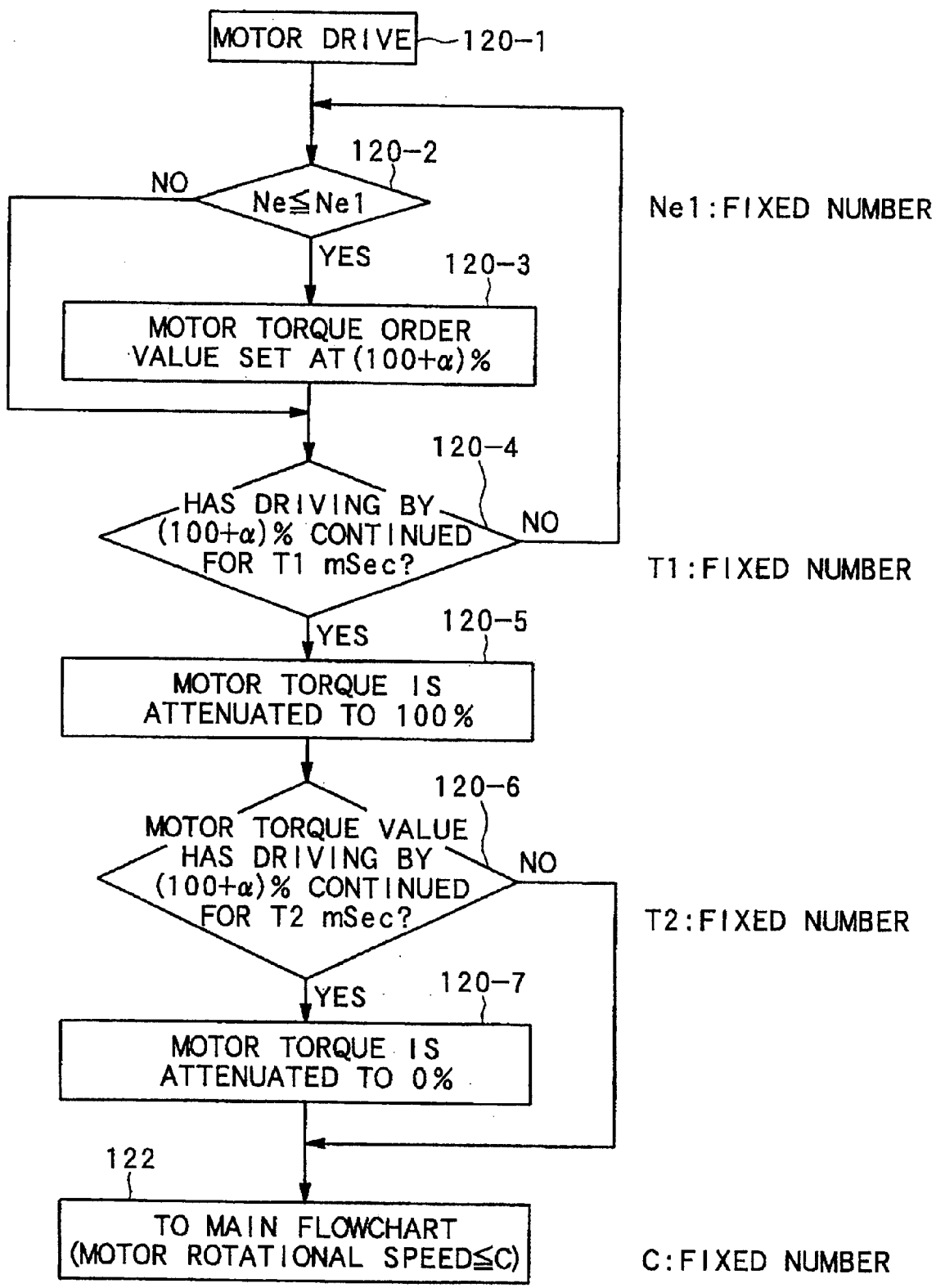
FIG. 1 is a flowchart for overload driving control of an embodiment of the present invention.

When a drive of motor 4 is started at step 120-1, as shown in FIG. 1, a determination is made at step 120-2 as to whether motor rotational speed "Ne" is less than "Ne1" (rpm) (a fixed number), that is first motor rotational speed.

If determination in step 120-2 is "YES", meaning the motor rotational speed "Ne" is less than "Ne1" (rpm), then a motor torque order is set at 100+α (%) at step 120-3. Then a determination is made at step 120-4 whether driving by overload torque order value 100+α (%) from the torque output (%) is continued for "T1" (msec) (a fixed number) as a first continuing time.

If determination in step 120-2 is "NO", then a determination is made at step 120-4 whether driving by overload torque order value 100+α (%) from the torque output (%) is continued for "T1" (msec).

When the determination in step 120-4 is "NO", the routine is returned to previous step 120-2 as to whether a motor rotational speed "Ne" is less than "Ne1" (rpm), which is a first motor rotational speed. When the determination in step 120-4 is "YES", a motor torque order value becomes an overload torque order value 100+α (%) which is damped to the value of 100% at step 120-5 (Referring to part of dashed line in FIG. 3).

Moreover, when the motor torque order value has been damped to the value of 100% at step 120-5, then a determination is made at step 120-6 as to whether a driving by the motor torque order value 100% has continued for "T2" (msec) (a fixed number). If the determination in step 120-6 is "YES", then the motor torque order value is damped to the value of 0% at step 120-7, and the routine is returned to step 122 in the main flowchart of FIG. 2. If the determination in step 120-6 is "NO", then the routine is returned immediately to step 122 in the main flowchart in FIG. 2.

When the engine 2 cannot be restarted by only the motor 4, then an idle stop executing signal (EIL) output (the idle stop executing (IS) input) of the engine control means (priority controller) 24 is set as follows. When an idle stop executing signal (EIL) output becomes "ON" and a starter driving signal (STR) output becomes "ON", a restart-up after an idle stop is executed. In case that engine 2 cannot be restarted (say "start NG"), when an ignition key is turned to the position of "START" (starter motor drive), an idle stop executing signal (EIL) output is immediately changed into "OFF" from "ON".

In a control of said 12V starter relay drive signal (STD), the starter relay drive signal (STD) is output synchronizing with an input of a starter switch-on signal of an inverter 66 of the motor control means 26 (ST) (an output of a starter relay drive signal of engine control means 24). In addition, when the starter switch-on signal (ST) is input (i.e. "ON"), then a starter relay drive signal (STD) is output (i.e. "ON"). Furthermore, when an input of the starter switch-on signal (ST) is stopped (i.e. "OFF"), then an output of the starter relay drive signal (STD) is stopped (i.e. "OFF"). Incidentally, a start assist control mode is not removed by stopping input of starter switch-on signal (ST) (i.e. "OFF" of ST), but is continued. Therefore, the start assist control mode becomes unrelated to the starter switch-on signal (ST), once an assist by motor 4 begins.

When an engine activation signal is not output before motor 4 is driven, then the motor 4 stops to drive. Accordingly, when an input of a starter switch-on signal (ST) is stopped (i.e. "OFF") during start assist control waiting mode (mode 2), a start assist motor drive mode (mode 3) is not executed. Thus, in the start assist control waiting mode (mode 2), before a motor assist begins, if the input of a starter switch-on signal (ST) is stopped (i.e. "OFF"), then a motor assist does not execute.

When, in drive control of motor 4, an engine drive signal to starter motor 16 by operation of an ignition key is input, motor 4 starts to drive after the condition that starter motor 16 begins to drive at least has been satisfied. In addition, the reason to include start assist control waiting mode (mode 2) in the input of a starter drive signal (STR) is as follows. If a ring gear in the crank axis side is not stopped, because it becomes impossible for a pinion gear of the starter motor 16 to engage with a ring gear, the start assist control waiting mode (mode 2) takes charge for the time necessary for the pinion gear to engage with a ring gear. As a means to count this time, anything is good if it can measure until exceeding setting time (sec) and setting rotational speed (rpm).

Moreover, as an emergency situation operation in a restart-up, during operation of automatic start-up/stop control of engine 2, a start-up of engine 2 only by motor 4 is not successful. Thus, to satisfy a restart-up condition, drive of motor 4 is stopped at once when a start-up of engine 2 by an ignition key has been added. Accordingly, as shown in FIG. 4, when restart-up motor 4 only has been executed, and when engine 2 cannot rotate by any amount in an emergency situation, starter motor 16 is used by operation of an ignition key. The following control is executed in order to smoothly perform the restart-up operation.

The motor control means 26 controls inverter 66. The inverter 66 inputs a starter switch-on signal (ST) (output of starter drive signal (EIL) of engine control means 24) when restarted by motor 4 only (in a restart-up of idle stop). When an input state of the starter switch-on signal (ST) is stopped (from "ON" to "OFF") (output of idle stop executing signal (EIL) of engine control means 24) and when regarding rotational speed of the motor 4, the condition "motor rotational speed of the motor≦Ne2 (rpm)" is satisfied, start-up only by motor 4 is stopped, and the engine 2 is started by drive of both motor 4 and starter motor 16 with sub-battery 28. However, when the condition is not satisfied, then the control to start up using only motor 4 is continued.

In this embodiment, when a start-up of engine 2 by operation of an ignition key is executed, starter motor 16 is started, and motor 4 assists so as to increase engine rotational speed. Accordingly, the restart-up of engine 2 when an idle stop is activated is executed by motor 4 of which a motor output value is set to a value that exceeds a rated performance. The restart of the engine 2 at idle stop is executed by motor 4. Then, when the ability of main battery 30 is determined to be lacking, the starter motor 16 is started and motor 4 assists. Thus, an assist with motor 4 is always activated even if starting of engine 2 is executed by starter motor 16. When operation of the ignition key has not been completely finished, the assist by motor 4 is not executed, and an initial state is maintained. In addition, when engine 2 is not able to be started by motor 4, even if determined that a restart-up by motor 4 is all right, then momentary operation of the ignition key activates starter motor 16. At this time, when the operation of the ignition key is executed, simultaneously, a motor drive order is cancelled and the motor 4 stops at once. Further, when engine 2 has already started earlier, then the actuation or operation of the ignition key is cancelled.

By this system, the total use time that is necessary to decide performance of motor 4 is short, but performance of motor 4 can be decided without adapting to a needed performance at start-up such that high performance is necessary. Accordingly, motor 4 can be miniaturized because the performance necessary for the assist control is not higher than a requirement at start-up. The space efficiency for carrying the motor 4 can be improved. The space efficiency that is a ratio to mount in limited space of engine rooms and the like can be improved. The space efficiency that is a ratio to mount in the limited space of engine rooms and the like can be improved. The whole system is capable of a lighter weight. As a result, this system can contribute to improvement of exhaust gas purification performance and fuel efficiency performance.

The control means 22 restarts up engine 2 by the motor output value of motor 4 in an overload driving state, that is set to exceed a rated performance. When the restart-up by the motor output value has been continued for a set time period, the control means 22 controls so as to decrease the motor output value of motor 4 that is set to exceed rated performance. Accordingly, this system can contribute to miniaturization of motor 4. Because it is only a limited short time period that the motor output value of motor 4 is set to exceed rated performance, there is no anxiety about negative influences to reliability and life of the motor at all.

Moreover, when an engine restart-up by the motor 4 only is not successful, and when a restart-up of the engine by operation of ignition key is added, then the control means 22 controls to immediately stop drive of the motor 4. Accordingly, when an engine start by motor 4 only fails, and when starter motor 16 is started afresh by key operation, the motor drive can be stopped immediately. As a result, with this system it is possible to maintain the life of the sub-battery 28 for a long time, and it is advantageous economically.

In addition, the control means 22 controls the motor 4, which is arranged in between the engine 2 and the transmission 8. The control means starts up engine 2 and controls the motor 4 so as to execute overload driving at a start-up of the engine 2. Accordingly, in this system, both vehicle types mounted with an engine only and a hybrid engine can be set to execute overload driving at a start-up of engine 2. If size of a motor (depth and diameter direction) gives great influence to the size of an engine room, the size of the motor can be suited to reasonable size to have the performance that assist driving is able to provide. The motor is selected such that overload driving at start-up is enabled. As a result, this system makes it possible to turn size of a motor into a compact size, and is advantageous in practical use.

Furthermore, this invention is not limited to the above-mentioned embodiments, but is suitable to many possible innovations and applications For example, when an engine is restarted by electric motor 4 only, the embodiment of this invention is the arrangement, such that a control means sets the motor output value of the electric motor to a value that exceeds rated performance. But, as a special arrangement, rotary power of the electric motor 4 is accumulated in a flywheel once, and utilizing the electric motor with the motor output value of rated performance and the flywheel, can perform a restart-up of the engine.

In this system, a flywheel, which can accumulate rotatory power, is arranged. The flywheel is rotated by the electric motor 4 just before a restart-up of the engine 2 is performed. In the restart-up of the engine 2, the rotary power of the rotating flywheel and the electric motor with a motor output value of rated performance are utilized. Thus, this system lets the rotary power that accumulated in the flywheel beforehand to function effectively.

Then, even if the electric motor 4 is miniaturized as the performance that is necessary for the assist control, in a restart-up of the engine 2, this system can superpose an accumulated rotatory power of the flywheel to the electric motor with a motor output value of rated performance. Accordingly, restarting performance of the engine 2 can be improved. In addition, by rotating the flywheel, the restart-up is quicker or earlier. Further, acceleration becomes easy, and this system is advantageous in practical use.

Thus, by utilizing the electric motor 4 and the flywheel, the restarting-up performance of the engine 2 can be improved about 2 times. Therefore, this system can contribute to more miniaturization of the electric motor.

Further, just before the restart operation of an engine is performed, a system for restart-up of the engine can be checked. For example, during operation of automatic start-up/stop control of an engine, a determination of a starting-up condition may be started.

In addition, the embodiment of this invention is arranged to use one electric motor. However, as a special arrangement, two electric motors which have about 60% of rated performance of the electric motor of the embodiment may be used.

Accordingly, an assist operation and a restart of the engine can be caused by driving two electric motors. When either of the electric motors has broken down, the system controls so as to drive the remaining electric motor at a motor output value exceeding the rated performance of the electric motor of about 60%, and is able to function in an emergency. As a result, safety of a hybrid vehicle can be improved still more.

Incidentally, the embodiment of this invention omits a detailed statement about a rated performance for the electric motor and a value exceeding its rated performance. However, for example, when rated performance is 100%, if the value exceeds 100%, which is a ratio of overload driving, and the value becomes small, the frequency of problems or failures for the electric motor can be reduced.

What is claimed is:

1. A control apparatus for a hybrid vehicle having an engine and an electric motor connected to an engine output shaft of the engine mounted on the vehicle, wherein the control apparatus performs an automatic start-up/stop control of said engine, starts said engine by a starter motor in a start-up of said engine by operation of a key, and always assists using said electric motor, said control apparatus including a controller that (1) controls to drive said electric motor by an engine activation signal so as to start up said engine by said electric motor only at restarting-up of said engine when a start-up condition is satisfied during operation of the automatic start-up/stop control of said engine, that (2) controls to drive said starter motor and said electric motor by outputting an engine activation signal so as to always assist using said electric motor when starting up using said starter motor at restarting-up of said engine when a start-up condition is not satisfied during operation of the automatic start-up/stop control of said engine, and that (3) sets a motor output value for said electric motor at a value exceeding a rated performance when said engine restarts up using only said electric motor.

2. The control apparatus for a hybrid vehicle as defined in claim 1, wherein said controller restarts said engine with the motor output value of said electric motor set at the value that exceeds the rated performance, and after a restart-up when the motor output value has been continued a set time, said controller controls to gradually decrease the motor output value of said electric motor that exceeds the rated performance.

3. The control apparatus for a hybrid vehicle as defined in claim 2, wherein said engine comprises an internal combustion engine.

4. The control apparatus for a hybrid vehicle as defined in claim 1, wherein when a restart-up of said engine by said electric motor only has not been successful, and when a restart-up of said engine by operation of the key is executed additionally, then said controller controls to immediately stop drive of said electric motor.

5. The control apparatus for a hybrid vehicle as defined in claim 4, wherein said engine comprises an internal combustion engine.

6. The control apparatus for a hybrid vehicle as defined in claim 1, wherein said engine comprises an internal combustion engine.

7. A control apparatus for a hybrid vehicle having an engine and an electric motor being connected to an engine output shaft of the engine mounted on the vehicle, wherein the control apparatus performs an automatic start-up/stop control of said engine, and assists start-up using said electric motor, said engine being started by a starter motor at start-up of said engine by operation of a key, wherein said control apparatus includes a controller that controls said electric motor, which said electric motor is located between said engine and a transmission, said controller controlling said electric motor to execute overload driving of said electric motor at a start-up of said engine driven only by said electric motor.

8. The control apparatus for a hybrid vehicle as defined in claim 7, wherein said controller restarts said engine with a motor output value of said electric motor set at a value that exceeds the rated performance, and after a restart-up when the motor output value has been continued a set time, said controller controls to gradually decrease the motor output value of said electric motor that exceeds the rated performance.

9. The control apparatus for a hybrid vehicle as defined in claim 8, wherein said engine comprises an internal combustion engine.

10. The control apparatus for a hybrid vehicle as defined in claim 7, wherein when a restart-up of said engine by said electric motor only has not been successful, and when a restart-up of said engine by operation of the key is executed additionally, then said controller controls to immediately stop drive of said electric motor.

11. The control apparatus for a hybrid vehicle as defined in claim 10, wherein said engine comprises an internal combustion engine.

12. The control apparatus for a hybrid vehicle as defined in claim 7, wherein said engine comprises an internal combustion engine.

* * * * *